United States Patent
Jiang et al.

(10) Patent No.: US 12,525,624 B2
(45) Date of Patent: Jan. 13, 2026

(54) SYSTEMS AND METHODS FOR FABRICATING MEMBRANE ELECTRODE ASSEMBLIES WITH STANDALONE MEMBRANES USING VACUUM PLATES

(71) Applicant: GM GLOBAL TECHNOLOGY OPERATIONS LLC, Detroit, MI (US)

(72) Inventors: Ruichun Jiang, Troy, MI (US); Michael Sweet, Macomb, MI (US); Kathryn L. Stevick, Howell, MI (US); Burl B. Keel, Waterford, MI (US); Jackie Mara, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 764 days.

(21) Appl. No.: 17/902,193

(22) Filed: Sep. 2, 2022

(65) Prior Publication Data
US 2024/0079611 A1   Mar. 7, 2024

(51) Int. Cl.
*H01M 8/0286* (2016.01)
*H01M 8/0273* (2016.01)
*H01M 8/1004* (2016.01)

(52) U.S. Cl.
CPC ....... *H01M 8/0286* (2013.01); *H01M 8/0273* (2013.01); *H01M 8/1004* (2013.01)

(58) Field of Classification Search
None
See application file for complete search history.

(56) References Cited

U.S. PATENT DOCUMENTS

| | | | |
|---|---|---|---|
| 7,192,668 B2 | 3/2007 | Dehne | |
| 8,092,957 B2 | 1/2012 | Rock et al. | |
| 8,387,441 B2 | 3/2013 | Falta et al. | |
| 9,553,327 B2 | 1/2017 | Fuller et al. | |
| 9,780,399 B2 | 10/2017 | Moose et al. | |
| 11,211,619 B2 | 12/2021 | Martuscelli et al. | |
| 2006/0064867 A1* | 3/2006 | Richards | H01M 8/248 29/623.1 |
| 2006/0286436 A1* | 12/2006 | Faghri | H01M 8/242 429/522 |
| 2013/0022895 A1 | 1/2013 | Jiang et al. | |
| 2013/0157167 A1 | 6/2013 | Peters et al. | |
| 2015/0171454 A1 | 6/2015 | Jiang et al. | |
| 2016/0190626 A1 | 6/2016 | Fuller et al. | |
| 2016/0372757 A1* | 12/2016 | Kim | H01M 4/8626 |
| 2018/0375138 A1* | 12/2018 | Nakatsuka | H01M 8/04731 |

\* cited by examiner

*Primary Examiner* — Alix E Eggerding
(74) *Attorney, Agent, or Firm* — Quinn IP Law

(57) ABSTRACT

Presented are systems for manufacturing membrane electrode assemblies for fuel cells, control logic for operating such systems, methods for making such MEAs, and fuel cell systems employing such MEAs. A method of manufacturing a membrane electrode assembly (MEA) for a fuel cell system includes receiving a standalone membrane (SAM) with a semipermeable proton-exchange membrane having opposing first and second faces and a backing layer attached to the first face. A SAM may be characterized by a lack of cathode and anode electrodes upon receipt of the membrane. The second face of the SAM is placed across a vacuum plate; the vacuum plate applies a predefined vacuum pressure to the SAM. While vacuum pressure is being applied to the SAM by the vacuum plate, the backing layer is removed from the SAM. A subgasket is then attached to the first face of the SAM after the backing layer is removed.

20 Claims, 4 Drawing Sheets

SYSTEMS AND METHODS FOR FABRICATING MEMBRANE ELECTRODE ASSEMBLIES WITH STANDALONE MEMBRANES USING VACUUM PLATES

INTRODUCTION

The present disclosure relates generally to electrochemical fuel cell systems for converting hydrogen-rich fuels into electricity. More specifically, aspects of this disclosure relate to the manufacture of membrane electrode assemblies for fuel cell systems.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Hybrid-electric and full-electric vehicles employ a rechargeable energy storage system, such as a high voltage, high energy density electric vehicle battery (EVB) system or fuel cell system (FCS), to supply the requisite electricity for operating the vehicle powertrain's electric traction motor(s). As per the latter, a fuel cell is an electrochemical device generally composed of an anode electrode that receives a supply of hydrogen ($H_2$), a cathode electrode that receives an oxidizing agent ($O_2$), and an electrolyte barrier interposed between the anode and cathode electrodes. An electrochemical reaction is induced to oxidize hydrogen molecules at the anode side of the FCS—hydrogen gas is catalytically split in an oxidation half-cell reaction—to generate free electrons (−) and free protons (H+). The free hydrogen protons pass through the electrolyte barrier to the cathode side of cell, where these protons react with oxygen and electrons in the cathode to form various stack by-products, usually water and heat. Free electrons from the anode, however, are prevented from passing through the electrolyte; these electrons are redirected to a load, such as a vehicle's traction motors and accessories, before being received at the cathode.

Fuel cell architectures commonly employed in automotive applications utilize a solid polymer electrolyte membrane (PEM)—also referred to as a "proton exchange membrane"—to provide ion transport between the anode and cathode electrodes. Proton exchange membrane fuel cells (PEMFC) generally employ a solid polymer electrolyte (SPE) proton-conducting membrane, such as a perfluorosulfonic acid membrane, to separate product gases and provide electrical insulation of electrodes, in addition to isolation of electrons and conduction of protons. The anode and cathode are generally composed of finely dispersed catalytic particles (e.g., platinum) that are supported on carbon particles and mixed with an ionomer. For some manufacturing processes, this catalytic mixture may be deposited on the sides of the membrane to form the anode and cathode layers. The combination of the anode catalytic layer, cathode catalytic layer, and electrolyte membrane define a membrane electrode assembly (MEA) in which the anode catalyst and cathode catalyst cover opposite faces of the ion conductive solid polymer membrane. To yield the requisite electricity for powering an automobile, multiple fuel cells are assembled into a fuel cell stack to achieve a higher output voltage and allow for stronger current draw. A typical fuel cell stack, for example, may contain in excess of two hundred stacked fuel cells for a solitary vehicle.

SUMMARY

Presented herein are manufacturing systems for fabricating membrane electrode assemblies for fuel cells, control logic for operating such systems, methods for making such MEAs, and vehicle fuel cell systems employing such MEAs. In a non-limiting example, there are disclosed systems and methods for constructing membrane electrode assemblies with standalone membranes (SAMs) using vacuum plates. As used herein, the term "standalone membrane", including permutations thereof, may be defined to include a proton-conducting semipermeable membrane manufactured as a discrete, independent unit sans the anode and cathode electrodes and membrane coatings that are coated directly onto the electrodes/membrane. A method for fabricating membrane electrode assemblies with standalone membranes utilizes a vacuum plate or similarly suitable structure to apply a predefined vacuum pressure to the SAM in order to laminate the gas diffusion electrodes (GDEs), subgaskets, and/or other working faces onto opposing sides of the membrane. It may be desirable that the pressure plate be thermally conductive and heated to facilitate lamination of the GDE(s) and membrane to the subgasket(s). Each vacuum plate may be fabricated as a single-piece, planar structure from a metallic or composite material that is sufficiently large to extend beyond the active major faces of the MEA. A contact face of the vacuum plate has a preset porosity (e.g., about 3-20% porosity) and is connected to a vacuum pump to create a predefined minimum average vacuum pressure (e.g., at least about 75 pounds per square inch (psi)) and a predefined minimum average operating temperature (e.g., at least about 200 degrees Fahrenheit (° F.)).

Continuing with the above discussion of the representative MEA manufacturing process, the vacuum plate helps to secure the standalone membrane in place to facilitate removal of a backing layer from an opposing surface of the membrane. Doing so helps to prevent inadvertent wrinkling of the membrane and undesired delamination of other membrane-borne layers. At the same time, the vacuum plate helps to retain the GDE layer(s) in place while helping to align the membrane with the GDE and other FCS components. This manufacturing system is flexible and scalable to make various types of MEA assemblies and laminations, including: Catalyst Coated Diffusion Media (CCDM) MEAs (i.e., SAM with GDE(s) and w/wo subgasket(s)); Catalyst Coated Membrane (CCM) MEAs (i.e., SAM with electrode decal(s) and w/wo subgasket(s)); and Framed SAM (FSAM) MEAs (i.e., SAM with subgasket(s)). In addition to simplifying the MEA fabrication process by reducing steps of existing methodologies, disclosed systems and methods for fabricating MEAs help to eliminate problems from existing manufacturing technologies, including undesired soft-goods delamination, membrane wrinkling, subgasket binding defects, etc.

Aspects of this disclosure are directed to manufacturing workflow processes and techniques for making any of the disclosed MEAs or FCSs, as well as computer readable media (CRM) and control logic for operating any of the disclosed manufacturing systems or vehicles. In an example, a method is presented for manufacturing a membrane electrode assembly for a fuel cell system, including both automotive and non-automotive FCS. This representative method includes, in any order and in any combination with any of the above and below disclosed options and features: fabricating, assembling, accepting, or retrieving (collectively "receiving") a standalone membrane that includes a semipermeable proton-exchange membrane having opposing (first and second) faces with a hydrophobic and dielectric backing layer attached to one (first) face of the membrane; manually or mechanically placing the opposite (second) face of the membrane directly against, immediately above, or otherwise across a vacuum plate; applying a predefined vacuum pressure, either directly or indirectly, to the bottom (second) face of the SAM via the vacuum plate; while this vacuum pressure is being applied to the SAM by the vacuum plate, removing the backing layer from the SAM; and, after removing the backing layer, attaching a nonconductive, fluid-sealing subgasket to the top (first) face of the SAM.

In another example, a method is presented for manufacturing MEAs for vehicle FCSs, such as hybrid-electric and full-electric automobiles. This representative method includes, in any order and in any combination with any of the above and below disclosed options and features: receiving one or more SAMs, each including a semipermeable PEM with opposing (first and second) faces and a backing layer attached to one of the membrane faces, wherein each SAM is characterized by a lack of cathode and anode electrodes upon receipt of the SAM; placing the SAM across a single or multiple vacuum plates; applying a predefined vacuum pressure to the SAM via the vacuum plate(s); applying a predefined heating temperature to the SAM via at least one vacuum plate or a heating & compression plate; removing the backing layer from the face of the SAM while the vacuum pressure is being applied directly or indirectly to the SAM via the vacuum plate(s); and attaching a subgasket to the SAM after removing the backing layer and while applying the predefined heating temperature to the SAM via the vacuum/compression plate(s).

Additional aspects of this disclosure are directed to motor vehicles with electrified powertrains containing traction motors powered by fuel cell systems employing any of the disclosed membrane electrode assemblies. As used herein, the terms "vehicle" and "motor vehicle" may be used interchangeably and synonymously to include any relevant vehicle platform, such as passenger vehicles (e.g., HEV, FEV, fully and partially autonomous, etc.), commercial vehicles, industrial vehicles, tracked vehicles, off-road and all-terrain vehicles (ATV), motorcycles, farm equipment, watercraft, aircraft, etc. For non-automotive applications, disclosed concepts may be implemented for all logically relevant uses, including stand-alone power stations, portable power packs, backup generator systems, pumping equipment, residential, commercial and industrial uses, electric vehicle charging stations (EVCS), etc.

For any of the disclosed systems, methods, and vehicles, at least one (first) gas diffusion electrode layer is attached to the subgasket after the subgasket is attached to one (first) face of the SAM. Optionally, at least one (second) GDE layer is attached to another (second) face of the SAM, e.g., concurrent with placing the SAM onto the vacuum plate(s). In this instance, the layered SAM with subgasket(s) and GDE(s) at least partially define an MEA stack. After assembling the MEA stack, another (second) vacuum plate may be placed across the top of the stack, e.g., against the top (first) GDE layer. These vacuum plates may be mutually parallel and vertically spaced from each other, with each plate applying the same or, if desired, a distinct predefined vacuum pressure to the MEA stack.

For any of the disclosed systems, methods, and vehicles, the MEA stack may be placed between opposing (first and second) compression plates after attaching the GDE(s) to the SAM. The compression plates apply a predefined compressive force to the opposing faces of the MEA stack. For instance, the predefined compressive force may be at least about 150-250 psi and is applied for at least about two (2) minutes. It may be desirable that the vacuum plates each physically abuts a respective one of the compression plates when placing the MEA stack between the compression plates. While compressing the MEA stack using the compression plates, a predefined heating temperature may be applied to the MEA stack via one or both vacuum plates and/or one or both compression plates. The predefined heating temperature may be between about 250 to 350° F.

For any of the disclosed systems, methods, and vehicles, the predefined vacuum pressure applied by the vacuum plate(s) may be about 75-150 psi. Each vacuum plate may be fabricated, in whole or in part, from a rigid (metallic or composite) material as a single-piece, planar structure that has a preset porosity (e.g., about 60 L/min vacuum gas flow). Moreover, each vacuum plate may be fabricated with an array of surface suction ports and an internal suction manifold that fluidly couples the suction ports to a vacuum source. As indicated above, a SAM may be characterized by a lack of cathode and anode electrodes during the receiving and the placing of the SAM onto the vacuum/compression plates. It is also an option to attach a subgasket to a select face of the SAM while the predefined vacuum pressure is applied to the SAM via the vacuum plate(s).

For any of the disclosed systems, methods, and vehicles, a GDE layer may first be placed on a vacuum plate whereby vacuum pressure is applied to the GDE layer. A SAM is then applied onto the exposed (top) face of the GDE layer through which the vacuum pressure pulls on the SAM. After applying the SAM onto the GDE, a subgasket layer is then seated onto the exposed (top) face of the SAM; the subgasket layer is held in place by the vacuum pressure applied by the vacuum plate. During application of the vacuum pressure, the subgasket layer is laminated directly to the SAM and, thus, indirectly attached to the GDE layer. This three-layer framed SAM assembly may then be transferred or transported as a unit for incorporation into the final MEA. Another GDE layer may optionally be fixedly attached onto an exposed (top) face of the subgasket. If desired, another vacuum plate may be placed against an exposed (top) face of this GDE layer.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
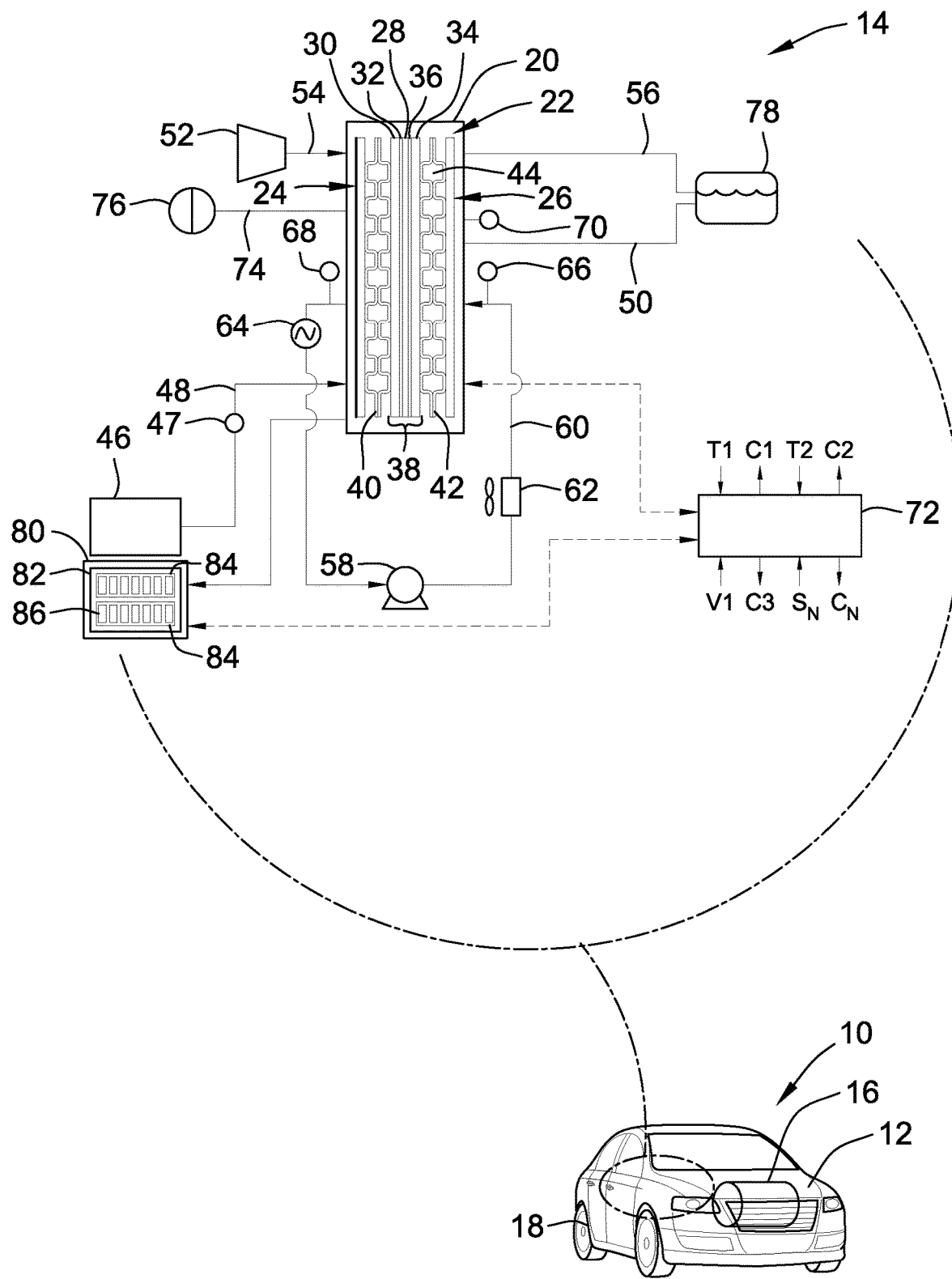
FIG. 1 is an elevated, perspective-view illustration of a representative motor vehicle with an inset schematic illustration of a rechargeable energy storage system containing a traction battery pack and a fuel cell system for operating the electric motor(s) of an electrified powertrain according to aspects of the disclosed concepts.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, fuel cell electric vehicle (FCEV). The illustrated automobile 10—also referred to herein as "motor vehicle" or "vehicle" for short—is merely an exemplary application with which novel aspects of this disclosure may be practiced. In the same vein, incorporation of the present concepts into a full-electric powertrain should be appreciated as a non-limiting implementation of disclosed features. As such, it will be understood that aspects and features of this disclosure may be applied to other powertrain architectures, utilized for a variety of different fuel cell system configurations, and incorporated into any logically relevant type of vehicle. Moreover, only select components of the motor vehicles, FCS, and manufacturing systems are shown and described in additional detail herein. Nevertheless, the vehicles and systems discussed below may include numerous additional and alternative features, and other available peripheral components, for carrying out the various methods and functions of this disclosure.

Packaged within the vehicle body 12 of automobile 10 is a representative fuel cell system 14 for powering a prime mover, such as electric motor generator unit (MGU) 16, that is operable for driving a combination of the vehicle's road wheels 18. Proton exchange membrane fuel cell system 14 of FIG. 1 is equipped with one or more fuel cell stacks 20, each of which is composed of multiple fuel cells 22 of the PEM type that are stacked and connected in electrical series or parallel with one another. In the illustrated architecture, each fuel cell 22 is a multi-layer construction with an anode side 24 and a cathode side 26 that are separated by a proton-conductive semipermeable polymer membrane 28. An anode gas diffusion electrode (GDE) layer 30 is provided on the anode side 24 of the PEMFC 22 with an anode catalyst layer 32 mounted onto the GDE layer 30 or interposed between and operatively connecting the membrane 28 and corresponding GDE layer 30. Juxtaposed in opposing spaced relation to the anode layers 30 and 32 is a cathode gas diffusion electrode (GDE) layer 34, which is provided on the cathode side 26 of the PEMFC 22. A cathode catalyst layer 36 is mounted onto the GDE layer 34 or interposed between and operatively connects the membrane 28 and corresponding GDE layer 34. The two GDE layers 30 and 34, two catalyst layers 32 and 36, and optional subgaskets (see FIG. 2 below) cooperate with the membrane 28 to define, in whole or in part, a membrane electrode assembly (MEA) 38.

The gas diffusion layers 30 and 34 may be porous constructions that provide for fluid inlet transport to and fluid exhaust transport from the MEA 38. An anode flow field plate 40 (with optional bipolar plate) is provided on the anode side 24 in abutting relation to the anode GDE layer 30. In the same vein, a cathode flow field plate 42 (with optional bipolar plate) is provided on the cathode side 26 in abutting relation to the cathode GDE layer 34. Coolant flow channels 44 traverse each of the plates 40 and 42 to allow cooling fluid to flow through the fuel cell 22. Fluid inlet ports and headers direct a hydrogen-rich fuel and an oxidizing agent to respective passages in the anode and cathode flow field plates 40, 42. A central active region of the anode's flow field plate 40 that faces the proton-conductive membrane 28 may be fabricated with an anode flow field composed of serpentine flow channels for distributing hydrogen over an opposing face of the GDE layer 30 and membrane 28. The MEA 38 and flow field plates 40, 42 may be stacked together between current collector plates and monopolar end plates (not shown). The fuel cell system 14 may also employ anode recirculation where an anode recirculation gas is fed from an exhaust manifold or headers through an anode recirculation line for recycling hydrogen back to the anode side 24 input so as to conserve hydrogen gas in the stack 20.

Hydrogen ($H_2$) inlet flow—be it gaseous, concentrated, entrained, or otherwise—is transmitted from a hydrogen source, such as fuel storage tank 46, to the anode side 24 of the fuel cell stack 20 via a fluid injector 47 coupled to a (first) fluid intake conduit or hose 48. Anode exhaust exits the stack 20 via a (first) fluid exhaust conduit or hose 50. Also shown on the inlet (lefthand) side of the stack 20 is a compressor or pump 52 that provides a cathode inlet flow, such as ambient air and/or concentrated gaseous oxygen ($O_2$), via a (second) fluid intake line or manifold 54 to the cathode side 26 of the stack 20. Cathode exhaust is output from the stack 20 via a (second) fluid exhaust conduit or manifold 56. Flow control valves, flow restrictions, filters, and other available devices for regulating fluid flow can be implemented by the PEN FC system 14 of FIG. 1. Electricity generated by the fuel cell stack(s) 20 and output by the fuel cell system 14 may be transmitted for storage to an in-vehicle traction battery pack 82 within a rechargeable energy storage system (RESS) 80.

Fuel cell system 14 of FIG. 1 may also include a thermal sub-system operable for controlling the temperature of the fuel cell stack 20, e.g., during preconditioning, break—in, and post-conditioning. According to the illustrated example, a cooling pump 58 pumps a coolant fluid through a coolant loop 60 to the fuel cell stack 20 and into the coolant channels 44 in each cell 22. A radiator 62 and an optional heater 64 fluidly coupled in the coolant loop 60 are used to maintain the stack 20 at a desired operating temperature. This thermal sub-system may be equipped with various sensing devices for monitoring regular system operation as well as progress of fuel cell conditioning and break-in. For instance, an inlet (first) temperature sensor 66 monitors a temperature value of the coolant at a coolant inlet to the fuel cell stack 20, and an outlet (second) temperature sensor 68 measures a temperature value of the coolant at a coolant outlet of the stack 20. An electrical connector or cable 74 connects the fuel cell stack 20 to an electric power load 76, which may be employed to draw current from each cell 22 in the stack 20. A voltage/current sensor 70 is operable to measure, monitor, or otherwise detect fuel cell voltage and/or current across the fuel cells 22 in the stack 20.

Programmable electronic control unit (ECU) 72 helps to control operation of the fuel cell system 14. As an example, ECU 72 receives one or more temperature signals T1 from one or more of the temperature sensors 66, 68 that indicate the temperature of the fuel cell stack 20; ECU 72 may be programmed to responsively issue one or more command signals C1 to modulate operation of the stack 20. ECU 72 of FIG. 1 also receives one or more voltage signals V1 from the voltage sensor/current 70; ECU 72 may be programmed to responsively issue one or more command signals C2 to modulate operation of a hydrogen source (e.g., fuel storage tank 46) and/or compressor/pump 52 to thereby regulate the electrical output of the stack 20. ECU 72 of FIG. 1 is also shown receiving one or more coolant temperature signals T2 from sensors 66 and/or 68; ECU 72 may be programmed to responsively issue one or more command signals C3 to modulate operation of the fuel cell's thermal subsystem. Additional sensor signals SN may be received by the ECU 72 and additional control commands CN may concomitantly be issued from the ECU 72, e.g., to control any other sub-system or component illustrated and/or described herein. The ECU 72 may emit a command signal to transmit evolved hydrogen and liquid $H_2O$ from the cathode side 26 through fluid exhaust conduit 56 to a water separator 78 (FIG. 1) where hydrogen and water from the cathode are combined with depleted hydrogen exhausted from the anode through fluid exhaust conduit/hose 50.

With continuing reference to FIG. 1, the traction battery pack 82 contains an array or rechargeable lithium-class (secondary) battery modules 84. Aspects of the disclosed concepts may be similarly applicable to other electric storage unit architectures, including those employing nickel metal hydride (NiMH) batteries, lead acid batteries, lithium metal batteries, or other applicable type of rechargeable electric vehicle battery (EVB). Each battery module 84 may include a stack or cluster of electrochemical battery cells, such as pouch-type lithium ion (Li-ion) or Li-ion polymer battery cells 86. An individual battery module 84, for example, may be typified by a grouping of 10-80 Li-ion battery cells that are stacked in side-by-side facing relation with one another and connected in parallel or series for storing and supplying electrical energy. While described as silicon-based, Li-ion "pouch cell" batteries, the cells 86 may be adapted to other constructions, including cylindrical and prismatic constructions.

Discussed below are MEA fabrication strategies that utilize the selective application of vacuum pressure to pre-defined segments of an MEA stack, for example, to facilitate: maintaining placement of the membrane, removing the backing layer(s) from the membrane, preventing wrinkling of the membrane, and precluding delamination of softgood layers, such as gas diffusion and membrane frame layers. Disclosed MEA fabrication strategies may combine vacuum, heat, and compression for stacking and joining together the constituent parts of the membrane electrode assembly. In addition to simplifying the MEA fabrication process, with attendant reductions in manufacturing cost, time, and waste, disclosed systems and methods may be scaled up or scaled down to make a variety of different membrane and MEA stack designs, such as CCDM MEAs, CCM MEAs, and F SAM MEAs.

Assembly of a fuel cell MEA using a standalone membrane generally necessitates stacking and laminating the gas diffusion layers and the subgasket layers to the membrane. Existing approaches require numerous (oftentimes superfluous) steps, including pre-tacking the GDE and SAM by hot-pressing, followed by removing any backing layers from the SAM, and then hot-pressing the obtained goods with the subgasket and another GDE. The existing approaches to SAM MEA fabrication, however, are unnecessarily complicated and may lead to delamination of the electrode & microporous layer (MPL) from the gas diffusion layer (GDL) substrate, difficulty with removing SAM baking layers due to heat, and wrinkling of the membrane during assembly. Disclosed concepts present manufacturing systems, methods, and control logic for fabricating MEAs with SAMs utilizing simpler and more robust processes.

Figure 2:
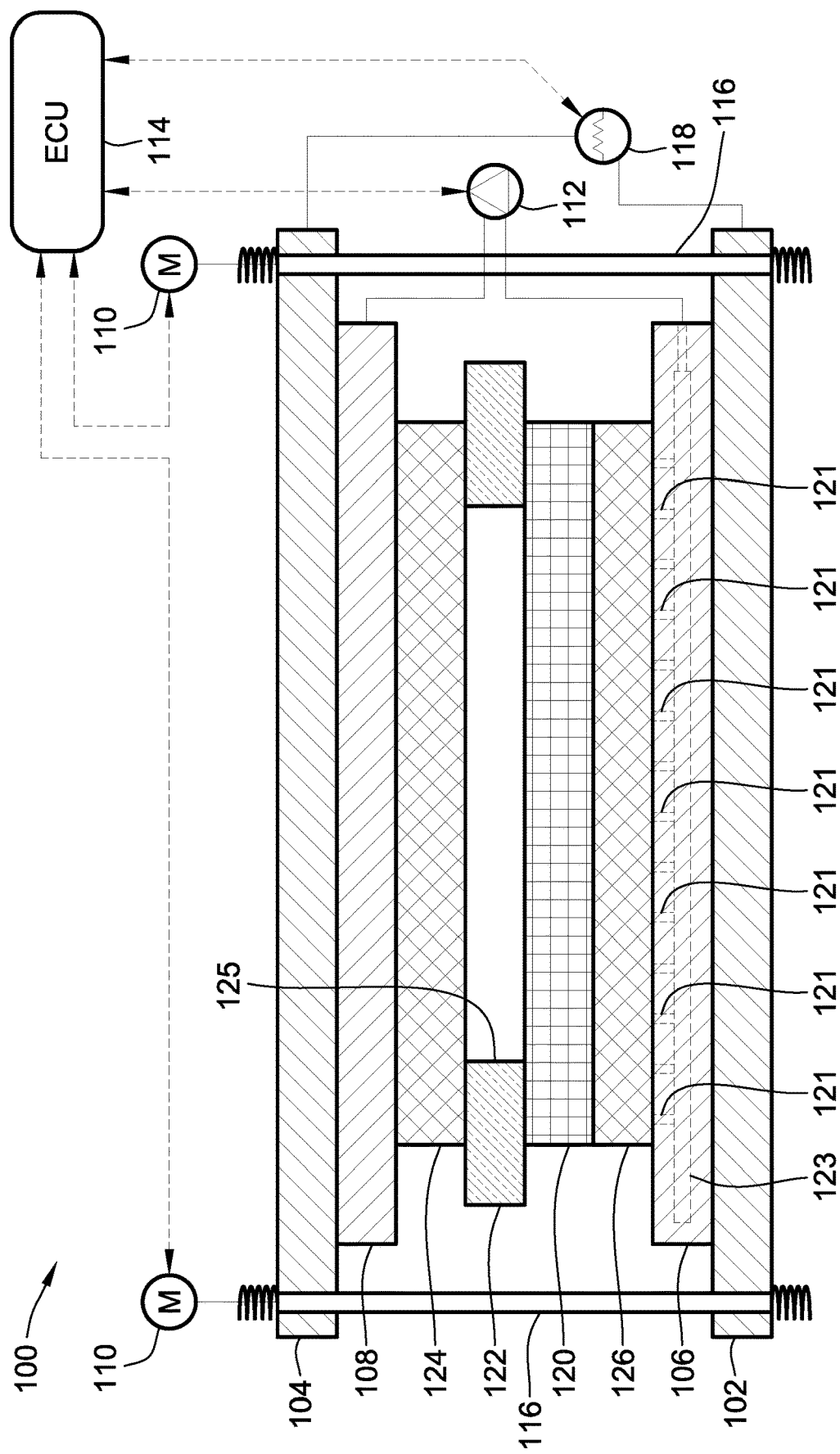
FIG. 2 is a schematic, side-view illustration of a representative manufacturing system and method for fabricating a fuel cell MEA with a SAM using a single vacuum and hot-press system with a pair of vacuum plates and a pair of compression & heat plates in accord with aspects of this disclosure.

Turning next to FIG. 2, there is shown a representative system and method (collectively designated 100) for manufacturing a membrane electrode assembly (e.g., MEA 38 of FIG. 1) for a fuel cell system (e.g., vehicle FCS 14 of FIG. 1) using a standalone membrane. In the illustrated example, the manufacturing system 100 is represented herein by: a pair of vertically spaced, mutually parallel bottom (first) and top (second) compression & heat plates 102 and 104; a pair of vertically spaced, mutually parallel bottom (first) and top (second) vacuum plates 106 and 108; a pair of electric power-screw motors (M) 110; an electric vacuum pump 112; and a central system electronic control unit (ECU) 114 for automating the system components to perform any of the herein described manufacturing processes. It will be appreciated that the manufacturing system 100 may include additional, fewer, and alternative hardware from that which is shown in FIG. 2. For instance, the compression plates 102, 104 may be mechanically driven towards and away from each other via the electric motors (M) 110 driving complementary power screws 116, as shown, or may employ alternative techniques for driving the plates, such as pneumatic, hydraulic, and electromagnetic press systems. Likewise, the vacuum plates 106, 108 may be activated via operation of a fluid pump 112, as shown, or may employ alternative devices to generate any requisite vacuum pressure, including motor-driven fans and centrifugal-rotodynamic suction devices. Optional electronic heater 118 is operatively connected to the compression & heat plates 102, 104 and/or the vacuum plates 106, 108 to selectively apply thermal energy (heat) to the MEA stack during assembly thereof.

In order to assemble a fuel cell MEA, a standalone membrane (SAM) 120 layer is received and placed with a bottom (second) face thereof facing the bottom (first) compression & heat plate 102 and the bottom (first) vacuum plate 106. The SAM 120 of FIG. 2 may be a semipermeable polymer-electrolyte, proton-conducting membrane having opposite bottom (first) and top (second) major faces. Unlike other MEA membrane constructions, the SAM is considered a "standalone" unit in that it lacks cathode and anode electrodes prior to receipt and placement of the SAM 120 into the manufacturing system 100 stand. As a non-limiting point of comparison, one available type of MEA membrane configuration includes active electrode layers that are coated (e.g., as catalyst ink) directly onto select microporous surfaces of the membrane. Contrastingly, a standalone membrane may be limited to the polymer electrode membrane without any electrocatalysts, gas diffusion layers, etc. The SAM 120 may be a soft and deformable single-piece film structure formed from an ionomer perfluorosulfonic acid (PFSA) material with a membrane thickness of about 5-15 micrometers (μm) with one or more optional backing layers (FIGS. 3 and 4) for membrane support and protection.

During MEA fabrication, a predefined vacuum pressure is applied to the SAM 120 via one or both of the vacuum plates 106, 108. For simplicity of design and ease of manufacture, the two vacuum plates 106, 108 may be substantially structurally identical to each other. For instance, each vacuum plate 106, 108 may be fabricated as a single-piece, planar structure using a rigid material, such as aluminum, steel, ceramic, graphite, composites, etc. To achieve optimized heating and compression functions, the vacuum plates 106, 108 are polyhedral panels made entirely from aluminum alloy or stainless steel and having a preset porosity. For example, the vacuum plates 106, 108 may be machined to include a rectangular array of surface suction ports 121 that are fluidly coupled to an internal suction manifold 123 that, in turn, fluidly couples the suction ports 121 to a negative-pressure vacuum source (e.g., vacuum pump 112). Each vacuum plate 106, 108 may thereby impart a predefined vacuum pressure of at least about 75 psi or, in some applications, approximately 100-150 psi. The vacuum plates 106, 108 have substantially flat, inwardly facing interface surfaces, e.g., with minimum vacuum area of at least about 30 cm by 20 cm. Each plate 106, 108 may contain approximately 80-120 suction ports 121, each of which may be a circular hole with a diameter of about 0.05-0.15 cm. An airflow rate of approximately 30-90 L/min may be drawn through these suction ports 121 by the vacuum pump 112. While one or both vacuum plates 106, 108 apply vacuum pressure to the SAM 120, a backing layer (FIGS. 3 and 4) may be removed from the SAM 120.

Once the SAM 120 is received, preprocessed (e.g., inspected, cleaned, etc.), secured in place via the vacuum plate(s) 106, 108, and any extant backing layers are removed, one or more electrically nonconductive, fluid-sealing subgaskets are fixed to the top and/or bottom faces of the SAM 120. By way of example, a lone subgasket 122 layer is fixedly mounted directly to the top face of the SAM 120 in FIG. 2, e.g., in order to fluidly couple and electrically isolate the SAM 120 to/from an adjacent diffusion layer. It may be desirable that the each subgasket 120 be formed as a one-piece structure from a flexible polymeric material, such as a polyethylene terephthalate (PET) or polyethylene naphthalate (PEN) sheet. A primary subgasket aperture 125 extends through a central region of the subgasket 122 and substantially corresponds to an active area of a gas diffusion layer and adjoining bipolar plate stacked onto the SAM 120 via the subgasket 122. According to aspects of the disclosed concepts, the subgasket 122 is laminated onto the top face of the SAM 120 while vacuum pressure is applied to the SAM via the bottom vacuum plate 106 and after a backing layer covering the top face of the SAM 120 is peeled off and discarded.

A pair of gas diffusion electrode (GDE) layers 124 and 126 are attached to opposite sides of the SAM 120, e.g., to collectively form an MEA stackup that can be utilized to construct a fully functional fuel cell assembly (e.g., fuel cell 22 of FIG. 1). In accord with the illustrated example, a top (first) GDE layer 124 is laminated onto a top face of the subgasket 122 and, via the subgasket 122, rigidly mounted onto the top face of the membrane 120. Bottom (second) GDE layer 126, in contrast, is rigidly mounted directly onto the bottom face of the membrane 120. Each GDE layer 124, 126 is a gas-permeable diffusion media (e.g., electrically conductive carbon fabric) that also functions as a respective one of the electrochemical fuel cell electrodes for operating the FCS. For instance, the fuel cell anode and cathode electrodes may be formed by metered deposition (e.g., printing, spraying, dipping, brushing, rolling, coating, etc.)

of a catalyst ink onto the top and bottom GDE layers 124, 126. It may be desirable that the catalyst ink be applied to a side of the GDE layer 124, 126 that faces the SAM 120. To facilitate stacking and joining of the MEA's constituent parts, the top GDE layer 124 may be mounted onto the subgasket 122 after the subgasket is mounted onto the SAM 120. Moreover, the bottom face of the SAM 120 may be placed against the top face of the bottom GDE layer 126 after placing the bottom GDE layer 126 onto the bottom vacuum plate 106 and before applying vacuum pressure to the SAM 120.

The representative manufacturing system and method 100 of FIG. 2 enables the construction of an entire fuel cell MEA using a single MEA vacuum and hot-press stand with a pair of compression & heat plates 102, 104 and a pair of vacuum plates 106, 108 that cooperatively provision vacuum, press, and heating capabilities. In this example, a bottom GDE layer 126 is placed onto the bottom vacuum plate 106 (e.g., a vacuum or vacuum & heat plate) with the bottom-facing gas diffusion substrate (GDS) side of the GDE layer 126 laying directly against the vacuum plate 106. A predefined average vacuum pressure (e.g., approximately 60 L/min vacuum gas flow for about 85-100 psi pressure) is then applied to the entire bottom face of the GDE layer 126 to ensure that the GDE layer 126 is held in a stable position without causing damage to the GDE materials. A standalone membrane 120 is received, inspected, and cleaned (if needed); an exposed bottom face of the SAM 120 is placed against a catalyst-carrying top face of the bottom GDE layer 126 such that a backing layer on a covered top face of the SAM 120 faces upwards. With the membrane 120 being held in place by the vacuum force from the bottom vacuum plate 106 passing through the fluid-permeable GDE layer 126, the backing layer is peeled off of the SAM 120 without causing movement or deformation of the diffusion and membrane layers. After removing the backing layer, a subgasket 122 layer is fixedly attached, e.g., via an adhesive coating or spray, to the now-exposed top face of the membrane 120.

Prior to, contemporaneous with, or after stacking the GDE layer 126, SAM 120, and/or subgasket 122 onto the bottom compression and vacuum plates 102, 106, a top GDE layer 124 is placed against a top vacuum plate 108 (e.g., a vacuum or vacuum & heat plate), with the top-facing GDS side of the GDE layer 124 laying directly against the vacuum plate 108. A predefined average vacuum pressure (e.g., the same as or measurable larger than the vacuum pressure applied by the bottom vacuum plate 106) is then applied to the entire top face of the GDE layer 124 to ensure that the GDE layer 124 is held in a stable position without damaging the GDE materials. While being held in place by the top vacuum plate 108, the top GDE layer 124 is pressed against and laminated to the top face of the subgasket 122 by applying a predefined compressive force (e.g., approximately 160 psi) and a predefined heating temperature (e.g., approximately 295° F.) for a predefined compression time (e.g., at least about two (2) minutes) to the MEA stack. While shown as four separate plates, it is plausible that the bottom compression & heat plate 102 and bottom vacuum plate 106 may be combined into a single plate structure, and the top compression & heat plate 104 and top vacuum plate 108 may be combined into another plate structure. To that end, the stacking and assembly of the MEA need not necessarily be along a vertical plane and, thus, could be reoriented along a horizontal or oblique plane.

Figure 3:
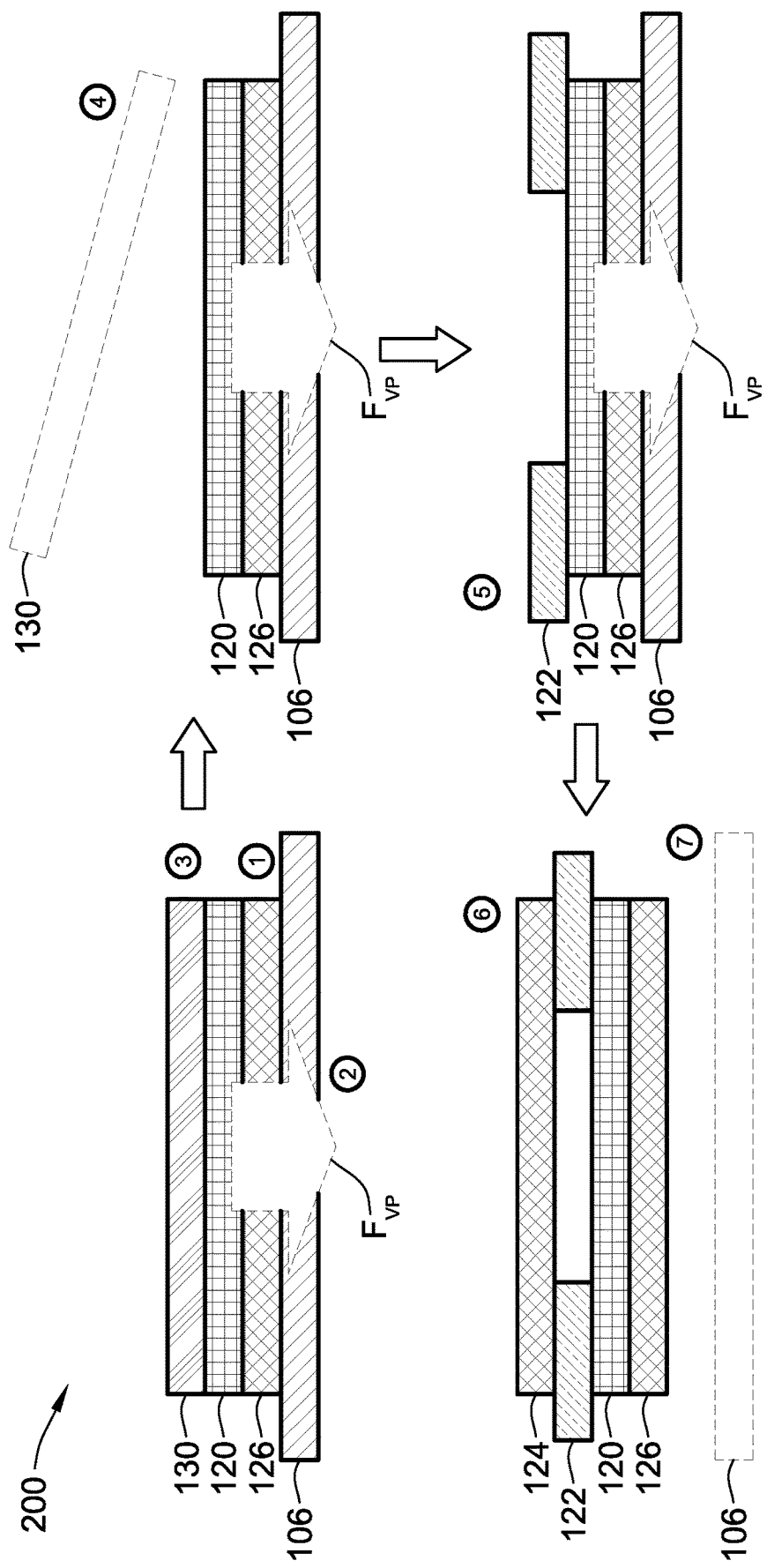
FIG. 3 is a schematic, side-view illustration of another representative manufacturing system and method for fabricating a fuel cell MEA with a SAM using separate transfer and hot-press subsystems in accord with aspects of this disclosure.

With reference next to FIG. 3, wherein like reference numbers refer to the same or similar features from the other views, there is shown a representative manufacturing system and method (collectively designated 200) for fabricating a fuel cell MEA with a SAM using separate transfer and hot-press subsystems/stands. At Step (1), a bottom GDE layer 126 is laid against a bottom vacuum plate 106 with the GDS side of the GDE layer 126 facing the plate 106. At Step (2), a vacuum pressure force FVP is applied to substantially all of the contact interface area between the GDE layer 126 and vacuum plate 106 to ensure the GDE layer 126 is held in place without damaging the GDE materials. At Step (3), an uncovered bottom face of a standalone membrane 120 is then laid directly against an electrode-bearing top face of the bottom GDE layer 126 such that a backing layer 130 on the opposite side of the SAM 120 from the GDE layer 126 faces away from vacuum plate 106. With the SAM 120 and GDE 126 retained in place by the vacuum force of the vacuum plate 106, the backing layer 130 is physically removed (e.g., removed by hand or by controller-automation robot/device) from the SAM 120, as indicated at Step (4).

After removal of the backing layer 130, a subgasket 122 layer is placed onto the SAM 120 at Step (5), e.g., with an adhesive layer on the bottom face of the subgasket 122 pressing against the upper face of the membrane 120. While not per se required, the vacuum pressure force FVP may be discontinued and another GDE layer 124 may be placed on top of the subgasket 122 layer, e.g., with the electrode-bearing surface thereof facing the subgasket 122 and membrane 120, as indicted at Step (6). Prior to, contemporaneous with, or after attaching the GDE layer 124 to the subgasket 122, the MEA stack is transferred to a separate MEA hot-press apparatus (e.g., manufacturing system 100 without the vacuum plates 106, 108 and vacuum pump 112), as indicted at Step (7). Once transferred, a predefined compressive force (e.g., approximately 150-200 psi) and a predefined heating temperature (e.g., approximately 250-300° F.) is applied to the MEA stack for a predefined compression time (e.g., approximately 1.5-2.5 mins). It is also within the scope of this disclosure to maintain vacuum pressure on the stackup when placing the GDE layer 124 onto the subgasket 122. As yet a further option, another vacuum plate (e.g., top vacuum plate 108 of FIG. 2) may abut and apply vacuum pressure to the GDE layer 124, e.g., in order to facilitate attachment of the GDE 124 to the subgasket 122 at Step (6).

Figure 4:
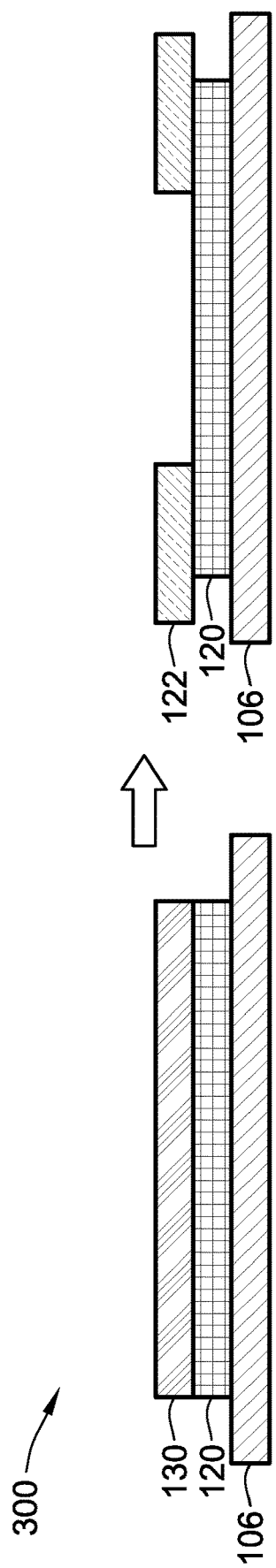
FIG. 4 is a schematic, side-view illustration of a representative manufacturing system and method for fabricating a frame SAM for a fuel cell MEA using a vacuum plate in accord with aspects of this disclosure.

FIG. 4 schematically illustrates an example of a manufacturing system and method (collectively designated 300) for fabricating a frame SAM for a fuel cell MEA. In this example, a SAM 120 with at least one backing layer 130 is received (e.g., from a membrane supplier). The SAM 120 is placed onto the bottom vacuum plate 106 with an uncovered bottom face of the membrane 120 facing the plate 106. To ensure the SAM 120 is held in a stable position without damaging the membrane and membrane materials, a predefined vacuum pressure (e.g., about 40 L/min vacuum airflow rate) is applied via the vacuum plate 106 to the entire bottom face of the membrane 120. With the SAM 120 held in place by the vacuum plate 106, the backing layer 130 is peeled off or otherwise removed from the top face of membrane 120 without causing membrane deformation or movement.

A subgasket 122 layer is mounted onto the top face of the SAM 120 (e.g., via adhesives or other suitable mounting method). The subgasket 122 may be formed from a PEN sheet that is pre-cut into a desired shape (e.g., rectangle frame with central window and multiple secondary apertures) and coated with an adhesive. The resulting Framed SAM may be transported as a unit to another manufacturing subsystem/stand whereat gas diffusion media and any other desired functional layers are joined to the F SAM to create a final MEA unit. The method 300 may help to reduce membrane material usage with attendant cost savings, while strengthening the edges of the membrane for improved mechanical protection and in-stack sealing. The framed SAM may be applied together with electrode layers, e.g., in a catalyst coated diffusion media (CCDM) format or catalyst coated membrane (CCM) format, to assemble the final MEA.

Figure 5:
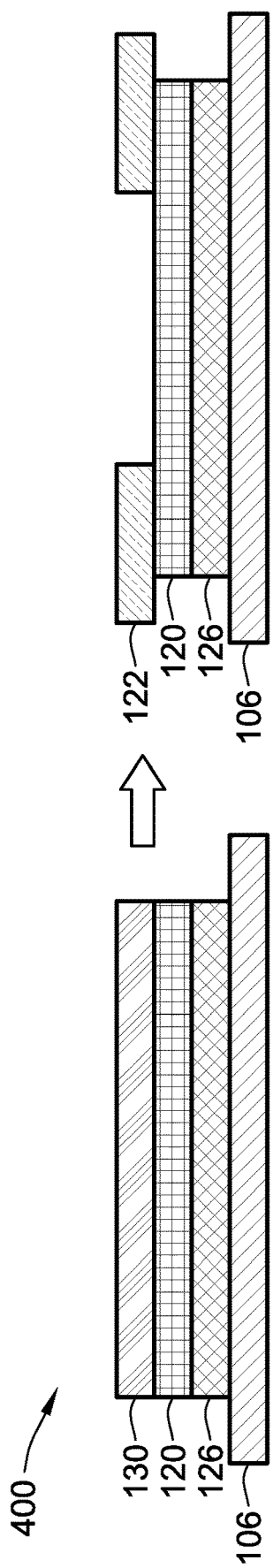
FIG. 5 is a schematic, side-view illustration of a representative manufacturing system and method for fabricating a frame SAM with GDE for a fuel cell MEA using a vacuum plate in accord with aspects of this disclosure.

FIG. 5 is a schematic illustration of a representative manufacturing system and method (collectively designated 400) for fabricating a frame SAM with GDE for a fuel cell MEA. In this example, a GDE layer 126 is placed on a vacuum plate 106 with the gas diffusion substrate side of the GDE layer 126 facing the plate 106. Vacuum pressure is applied to some or all of the contact area at which the GDE 126 interfaces with the plate 106. A standalone membrane 120 is placed on the GDE layer 126 with a backing layer 130 on the opposite side of the SAM 120 from the GDE layer 126. With the SAM 120 and GDE layer 126 held in place by the vacuum plate 106, the backing layer 130 is removed from the membrane 120 and GDE 126. A subgasket 122 layer is then placed onto the SAM 120 on a side thereof opposite that of the GDE layer 126.

Some or all of the operations illustrated in FIGS. 2-5 and described in detail above may be representative of an algorithm or algorithms or other suitable control logic that corresponds to non-transitory, processor-executable instructions that are stored, for example, in main or auxiliary or remote memory of a tangible form factor. These instructions, when executed by an electronic controller, processing unit, logic circuit, or other module or device or network of modules/devices, cause an automated manufacturing system to perform any or all of the above and below described functions associated with the disclosed concepts. It should be recognized that the order of execution of the illustrated operations may be changed, additional operations may be added, and some of the herein described operations may be modified, combined, or eliminated.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of manufacturing a membrane electrode assembly (MEA) for a fuel cell system, the method comprising:
   receiving a standalone membrane (SAM) with a semipermeable proton-exchange membrane having opposing first and second faces and a backing layer attached to the first face;
   placing the second face of the SAM across a first vacuum plate;
   applying a predefined vacuum pressure to the SAM via the first vacuum plate;
   removing the backing layer from the first face of the SAM while the predefined vacuum pressure is applied to the SAM via the first vacuum plate;
   attaching a subgasket to the first face of the SAM after removing the backing layer;
   attaching a first gas diffusion electrode (GDE) layer to the subgasket;
   attaching a second GDE layer to the second face of the SAM, wherein the SAM, the subgasket, and the first and second GDE layers at least partially define an MEA stack;
   placing a second vacuum plate across the first GDE layer;
   placing the MEA stack between first and second compression plates after attaching the second GDE layer to the second face of the SAM; and
   abutting the first and second vacuum plates against the first and second compression plates, respectively, when placing the MEA stack between the compression plates.

2. The method of claim 1, wherein the first GDE layer is attached to the subgasket after attaching the subgasket to the first face of the SAM.

3. The method of claim 2, wherein the second face of the SAM is attached to the second GDE layer before applying the predefined vacuum pressure to the SAM via the first vacuum plate.

4. The method of claim 3, further comprising applying the predefined vacuum pressure to the first GDE layer via the second vacuum plate.

5. The method of claim 3, further comprising applying a predefined compressive force to the MEA stack via the first and second compression plates.

6. The method of claim 5, wherein the predefined compressive force is at least about 200 pounds per square inch (psi).

7. The method of claim 5, further comprising applying a predefined heating temperature to the MEA stack via the first vacuum plate, the first compression plate, and/or the second compression plate while applying the predefined compressive force to the MEA stack via the first and second compression plates.

8. The method of claim 7, wherein the predefined heating temperature is between about 250 to 350 degrees Fahrenheit (° F.).

9. The method of claim 1, wherein the predefined vacuum pressure is at least about 75 pounds per square inch (psi).

10. The method of claim 1, wherein the first vacuum plate is a single-piece planar structure fabricated from a rigid material and having a preset porosity.

11. The method of claim 1, wherein the first vacuum plate includes surface suction ports and a suction manifold fluidly coupling the surface suction ports to a vacuum source.

12. The method of claim 1, wherein the SAM is characterized by a lack of cathode and anode electrodes during the receiving and the placing of the SAM.

13. The method of claim 1, wherein the attaching the subgasket to the first face of the SAM is while the predefined vacuum pressure is applied to the SAM via the first vacuum plate.

14. A method of manufacturing a membrane electrode assembly (MEA) for a fuel cell system, the method comprising:
- receiving a standalone membrane (SAM) with a semipermeable proton-exchange membrane having opposing first and second faces and a backing layer attached to the first face, wherein the SAM is characterized by a lack of cathode and anode electrodes during the receiving of the SAM;
- placing the second face of the SAM across a first vacuum plate;
- applying a predefined vacuum pressure to the SAM via the first vacuum plate;
- applying a predefined heating temperature to the SAM via the first vacuum plate;
- removing the backing layer from the first face of the SAM while the predefined vacuum pressure is applied to the SAM via the first vacuum plate;
- attaching a subgasket to the first face of the SAM after removing the backing layer and while applying the predefined heating temperature to the SAM via the first vacuum plate;
- attaching a first gas diffusion electrode (GDE) layer to the subgasket;
- attaching a second GDE layer to the second face of the SAM, wherein the SAM, the subgasket, and the first and second GDE layers at least partially define an MEA stack;
- placing a second vacuum plate across the first GDE layer;
- placing the MEA stack between first and second compression plates after attaching the second GDE layer to the second face of the SAM; and
- abutting the first and second vacuum plates against the first and second compression plates, respectively, when placing the MEA stack between the compression plates.

15. The method of claim 14, wherein the first GDE layer is attached to the subgasket after attaching the subgasket to the first face of the SAM.

16. The method of claim 15, wherein the second face of the SAM is attached to the second GDE layer before applying the predefined vacuum pressure to the SAM via the first vacuum plate.

17. The method of claim 16, further comprising applying a predefined compressive force to the MEA stack via the first and second compression plates.

18. The method of claim 17, further comprising applying the predefined vacuum pressure to the first GDE layer via the second vacuum plate.

19. The method of claim 14, wherein the first and second vacuum plates are each a single-piece planar structure fabricated from a rigid material and having a preset porosity.

20. The method of claim 14, wherein the first and second vacuum plates each includes a plurality of surface suction ports and a suction manifold fluidly coupling the surface suction ports to a vacuum source.

* * * * *